US011245767B1

(12) United States Patent
Yunoki

(10) Patent No.: US 11,245,767 B1
(45) Date of Patent: Feb. 8, 2022

(54) MULTI-ROUTE COMMUNICATION SYSTEM AND ROUTE SELECTION SYSTEM

(71) Applicant: Hitachi, Ltd., Tokyo (JP)

(72) Inventor: Shoji Yunoki, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/178,113

(22) Filed: Feb. 17, 2021

(51) Int. Cl.
  *G06F 15/16* (2006.01)
  *G06F 15/173* (2006.01)
  *H04L 29/08* (2006.01)
  *H04L 12/707* (2013.01)

(52) U.S. Cl.
  CPC ........... *H04L 67/141* (2013.01); *H04L 45/24* (2013.01)

(58) Field of Classification Search
  CPC ..... H04L 67/141; H04L 45/24; H04L 47/805; H04L 47/824; H04L 41/5019; H04L 41/0806
  USPC ........................................................ 709/227
  See application file for complete search history.

(56) References Cited

U.S. PATENT DOCUMENTS

| | | | |
|---|---|---|---|
| 2018/0270840 A1* | 9/2018 | Griot | H04L 5/0055 |
| 2019/0053104 A1* | 2/2019 | Qiao | H04L 47/20 |
| 2020/0036652 A1* | 1/2020 | Cui | H04L 47/805 |
| 2020/0275357 A1* | 8/2020 | Bordeleau | H04W 48/18 |
| 2020/0275358 A1* | 8/2020 | Bordeleau | H04L 41/0806 |
| 2020/0275359 A1* | 8/2020 | Bordeleau | H04L 41/0806 |
| 2020/0366567 A1* | 11/2020 | Li | H04L 47/805 |
| 2021/0160131 A1* | 5/2021 | Maguire | H04L 41/0886 |

* cited by examiner

*Primary Examiner* — Ruolei Zong
(74) *Attorney, Agent, or Firm* — Procopio, Cory, Hargreaves & Savitch, LLP

(57) ABSTRACT

Example implementations described herein are directed to management of communication sessions a target application for an underlying apparatus and a corresponding server. Such example implementations involve obtaining a plurality state, of a target application, each of which corresponds to delay requirement, establishing a plurality of communication sessions each of which satisfy the plurality of state using different network slices, specifying the network slices which satisfy the current state and sending data using the specified network slices. When the state of the target application is changed, the communication session and network slice is also changed to another communication session that satisfies the new state.

18 Claims, 13 Drawing Sheets

| | 301 | 302 | 303 | 304 |
|---|---|---|---|---|
| | Application Name | Port | State | Delay requirement [ms] |
| | Screw driving (human-robot collaboration) | 40001 | Tight Collaboration | 10 |
| | | | Normal | 100 |
| | Cutting parts | 40002 | High precision mode | 5 |
| | | | Low precision mode | 50 |

[Area emergency state table]

| Area ID | Client ID | Application name | Emergency state |
|---|---|---|---|
| 1 | 1 | Screw driving | No |
|   | 2 | Cutting parts | No |
| 2 | 3 | Screw driving | No |
|   | 4 | Cutting parts | No |

FIG. 11

[Application requirement table] 1200

| Application Name | Port | State | Delay requirement [ms] |
|---|---|---|---|
| Screw driving (human-robot collaboration) | 40001 | Emergency | 5 |
| | | Tight Collaboration | 10 |
| | | Normal | 100 |
| Cutting parts | 40002 | Emergency | 1 |
| | | High precision mode | 5 |
| | | Low precision mode | 50 |

FIG. 12

MULTI-ROUTE COMMUNICATION SYSTEM AND ROUTE SELECTION SYSTEM

BACKGROUND

Field

The present disclosure is generally directed to communication networks, and more specifically, to multi-route communication systems with route selection.

Related Art

In recent years, due to the sophistication of processes performed in factories, the importance of communication networks between devices installed in factories has increased. Requirements for communication such as delay and speed can vary depending on the process to be performed through the communication. Moreover, since communication resources are finite, it can be important to allocate the minimum necessary communication resources (e.g. Quality of Service (QoS) level) for communication between devices.

Related art implementations can include a system which allocates a QoS level to a communication dynamically depending on the content of data transmitted. However, it may take a long time to implement the QoS allocation change. Dynamic QoS allocation changes can cause disconnections of already established communication sessions.

SUMMARY

Example implementations described herein involve systems and methods to dynamically change the allocation of QoS levels to communications within a short time without causing disconnections of already established communication sessions. In particular, example implementations can facilitate the allocations of optimal QoS levels to each device in a manufacturing field.

Aspects of the present disclosure can involve a method for management of a system involving a plurality of apparatuses, each of the plurality of apparatuses managing a corresponding target application based on instructions from a server, the plurality of apparatuses communicating with the server through a network, the method involving, for each of the plurality of apparatuses, obtaining a plurality of states of the corresponding target application, each of the plurality of states corresponding to a delay requirement; establishing a plurality of communication sessions, each of the plurality of communication sessions facilitated by a network (NW) slice and an associated port, each of the plurality of communication sessions configured to satisfy a corresponding one of the plurality of states; specifying one of the plurality of communication sessions that satisfies a current state of the corresponding target application; sending data through the specified one of the plurality of communication sessions for the each of the plurality of apparatuses; and for a change of the corresponding target application from the current state to another state, changing the one of the plurality of communication sessions to another one of the plurality of communication sessions configured to satisfy the another state.

Aspects of the present disclosure can involve a computer program for management of a system involving a plurality of apparatuses, each of the plurality of apparatuses managing a corresponding target application based on instructions from a server, the plurality of apparatuses communicating with the server through a network, the computer program having instructions involving, for each of the plurality of apparatuses, obtaining a plurality of states of the corresponding target application, each of the plurality of states corresponding to a delay requirement; establishing a plurality of communication sessions, each of the plurality of communication sessions facilitated by a network (NW) slice and an associated port, each of the plurality of communication sessions configured to satisfy a corresponding one of the plurality of states; specifying one of the plurality of communication sessions that satisfies a current state of the corresponding target application; sending data through the specified one of the plurality of communication sessions for the each of the plurality of apparatuses; and for a change of the corresponding target application from the current state to another state, changing the one of the plurality of communication sessions to another one of the plurality of communication sessions configured to satisfy the another state. The instructions can be stored in a non-transitory computer readable medium and configured to be executed by one or more processors.

Aspects of the present disclosure can involve a computer device for management of a system involving a plurality of apparatuses, each of the plurality of apparatuses managing a corresponding target application based on instructions from a server, the plurality of apparatuses communicating with the server through a network, the computer device involving a processor, configured to, for each of the plurality of apparatuses, obtain a plurality of states of the corresponding target application, each of the plurality of states corresponding to a delay requirement; establish a plurality of communication sessions, each of the plurality of communication sessions facilitated by a network (NW) slice and an associated port, each of the plurality of communication sessions configured to satisfy a corresponding one of the plurality of states; specify one of the plurality of communication sessions that satisfies a current state of the corresponding target application; send data through the specified one of the plurality of communication sessions for the each of the plurality of apparatuses; and for a change of the corresponding target application from the current state to another state, change the one of the plurality of communication sessions to another one of the plurality of communication sessions configured to satisfy the another state.

Aspects of the present disclosure can involve a system involving a plurality of apparatuses, each of the plurality of apparatuses managing a corresponding target application based on instructions from a server, the plurality of apparatuses communicating with the server through a network, the system involving, for each of the plurality of apparatuses, means for obtaining a plurality of states of the corresponding target application, each of the plurality of states corresponding to a delay requirement; means for establishing a plurality of communication sessions, each of the plurality of communication sessions facilitated by a network (NW) slice and an associated port, each of the plurality of communication sessions configured to satisfy a corresponding one of the plurality of states; means for specifying one of the plurality of communication sessions that satisfies a current state of the corresponding target application; means for sending data through the specified one of the plurality of communication sessions for the each of the plurality of apparatuses; and for a change of the corresponding target application from the current state to another state, means for changing the one of the plurality of communication sessions to another one of the plurality of communication sessions configured to satisfy the another state.

BRIEF DESCRIPTION OF DRAWINGS

FIG. 3 illustrates an example of an application requirement table, in accordance with an example implementation.

FIG. 11 illustrates an area emergency state table, in accordance with an example implementation.

FIG. 12 illustrates an application requirement table, in accordance with an example implementation.

DETAILED DESCRIPTION

Figure 1:
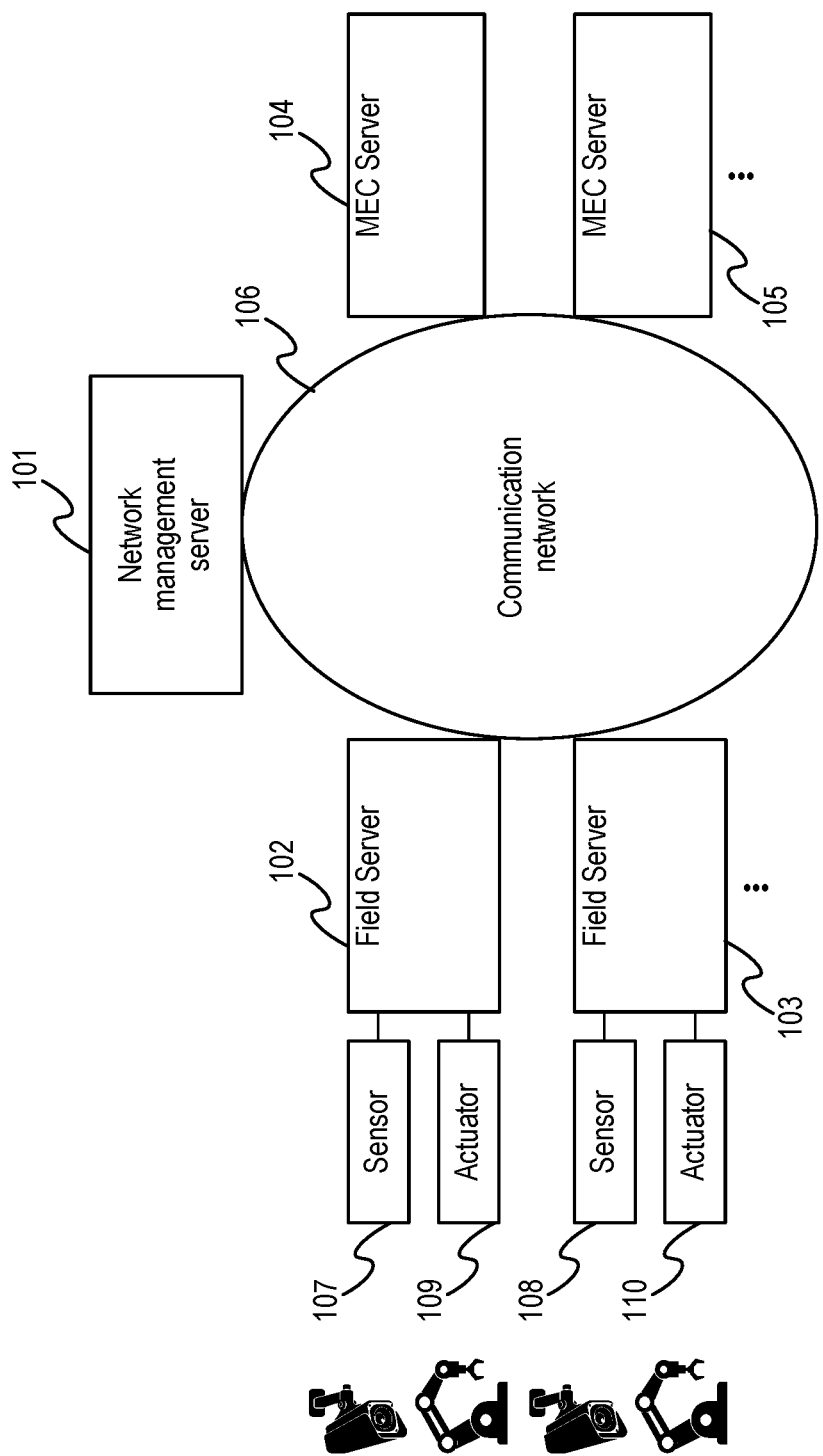
FIG. 1 illustrates a system architecture to which example implementations may be applied.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In a first example implementation, there are systems and methods which can obtain a plurality of states for a target application, each of the states corresponding to a delay requirement. Such systems and methods can establish a plurality of communication sessions, each of which satisfies the plurality of states through using different network (NW) slices (each of which may have a different service level agreement (SLA)). The systems and methods can specify the NW slice/port which satisfies the current state and send data using the specified NW slices. For the detection of a change to a second state, such systems and methods can change to the NW slice/port which satisfies the second state.

FIG. 1 illustrates a system architecture to which example implementations may be applied. The system can involve a network management server 101, field severs 102, 103, sensors 107, 108, actuators 109, 110, MEC (Mobile Edge Computing) servers 104, 105, and communication network 106. The sensors 107, 108 and the actuators 109, 110 are connected to the field servers 102, 103. The field servers 102, 103, the MEC servers 104, 105 and the network management server are connected to each other through the communication network 106.

The sensors 107, 108 and the actuators 109, 110 are used to execute manufacturing processes in plants. The field servers 102, 103 send sensor data acquired by sensors 107, 108 to the MEC server 104, 105 and control the actuators 109, 110 according to the control data received from the MEC servers 104, 105. The MEC server 104, 105 receives sensor data from the field servers 102, 103 through the communication network, generates control data according to the sensor data, and sends the control data to field servers through the communication network 106. The communication network 106 supports QoS features such as network slicing. 5G is an example of a communication network that supports QoS features. The network management server 101 manages QoS configuration information which indicates what QoS control is conducted in the communication network 106 and communication requirements for applications which are executed in the field servers 102, 103 and the MEC servers 104, 105.

Figure 2:
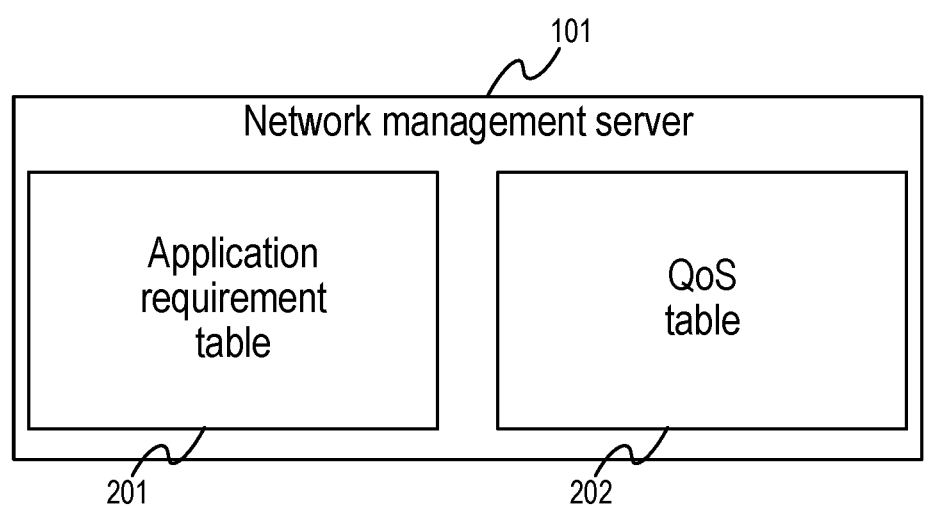
FIG. 2 illustrates a functional block diagram of a network management server, in accordance with an example implementation.

FIG. 2 illustrates a functional block diagram of a network management server 101, in accordance with an example implementation. The network management server 101 involves an application requirement table 201 and a QoS table 202. The application requirement table 201 stores the mapping between an application name, a port number to which the application operates, states to which the application can transition, and communication quality required by the application in each state. The QoS table 202 stores the mapping between guaranteed a network slice identifier (ID), guaranteed communication delay provided by the network slice, and a port number used by data which is routed into the network slice.

FIG. 3 illustrates an example of an application requirement table 201, in accordance with an example implementation. The application requirement table 201 involves the application name 301, port number 302, application state 303, and delay requirement 304. In the example of FIG. 3, the application "screw driving" operates on the port 40001 and involves two states including "Tight collaboration" and "Normal". When the state of the application is "Tight collaboration", the application requires a communication delay less than 10 [ms]. When the state of the application is "Normal", the application requires a communication delay less than 100 [ms].

As for the application "Cutting parts", the application operates on the port 40002 and involves two states which are "High precision mode" and "Low precision mode". When the state of the application is "High precision mode", the application requires a communication delay less than 5 [ms]. When the state of the application is "Low precision mode", the application requires a communication delay less than 50 [ms].

Figure 4:
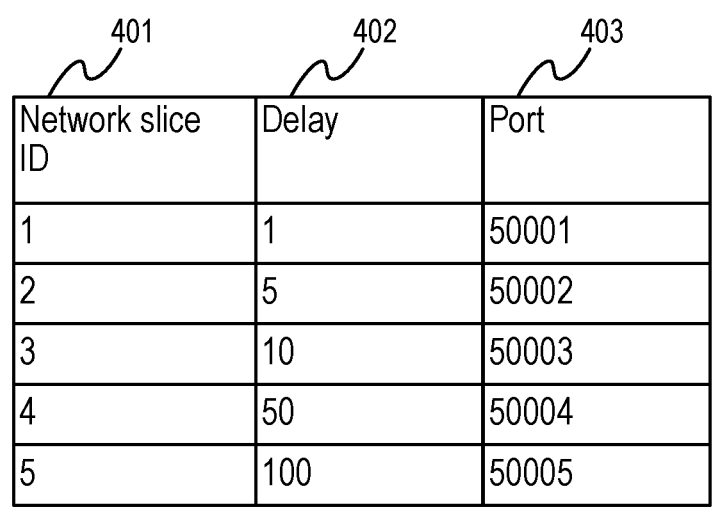
FIG. 4 illustrates an example of a QoS table, in accordance with an example implementation.

FIG. 4 illustrates an example of a QoS table 202, in accordance with an example implementation. The QoS table 202 involves a network slice ID 401, delay 402, and port number 403. A network slice is a virtual communication network in which a specific communication delay is guaranteed. In the example of FIG. 4, the network slice "1", the value of the guaranteed delay is 1 [ms]. Communication packets whose port numbers are 50001 are routed through the network slice 1.

Figure 5:
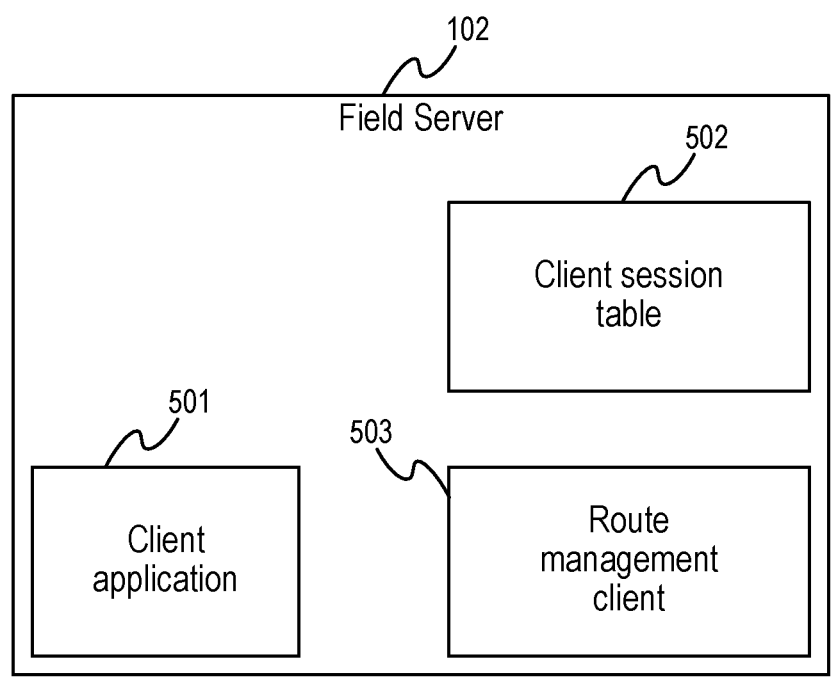
FIG. 5 illustrates a functional block diagram of a field server, in accordance with an example implementation.

FIG. 5 illustrates a functional block diagram of a field server 102, in accordance with an example implementation. The field server 102 can involve a client application 501, a client session table 502, and a route management client 503. The application 501 is used to execute a manufacturing process by communicating with a server application working in a MEC server 104. The client session table 502 is used to store what communication sessions are established and referred to by the route management client 503. The route management client 503 establishes communication sessions which satisfy the communication requirement for the application and route data through the appropriate session. As long as the client application 501 is connected to route management client 503, the client application does not necessarily have to be in the field server 102. For example, it can be in a computer which is connected to the rote field server 102 via ethernet cable. Other configurations are also possible in accordance with the desired implementation.

Figure 6:
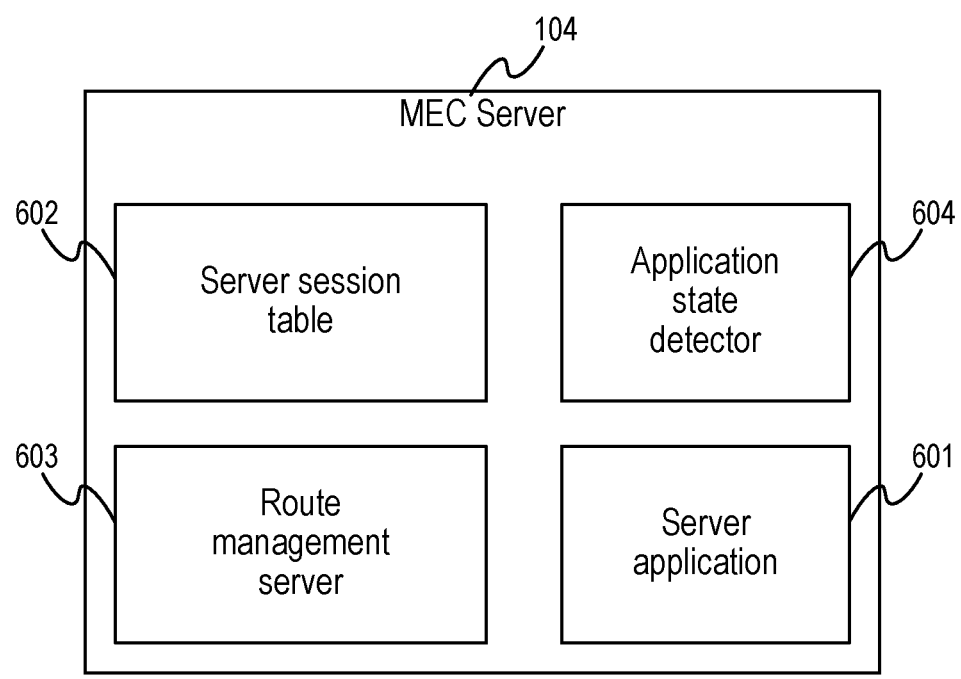
FIG. 6 illustrates a functional diagram of a MEC server, in accordance with an example implementation.

FIG. 6 illustrates a functional diagram of a MEC server 104, in accordance with an example implementation. The MEC server 104 involves a server application 601, a server session table 602, a route management server 603 and an application state detector 604. The server application 601 is used to execute manufacturing process by communication with a client application 501. The route management server 603 establishes communication sessions which satisfy the communication requirement for the application and route date through the proper session. The application state detector detects the current state of the application and notifies the route management server 603 of the state. The server session table 602 is to store what communication sessions are established and referred to by the route management server 603. As long as the server application 601 is connected to route management server 603, the server application 601 does not necessarily have to be in the MEC server 104. For example, it can be in a computer which is connected to the MEC server 104 via ethernet cable. The client application 501 and the server application 601 operate by collaborating with each other and they have the same application state in common. Other configurations are also possible in accordance with the desired implementation.

Figure 7:
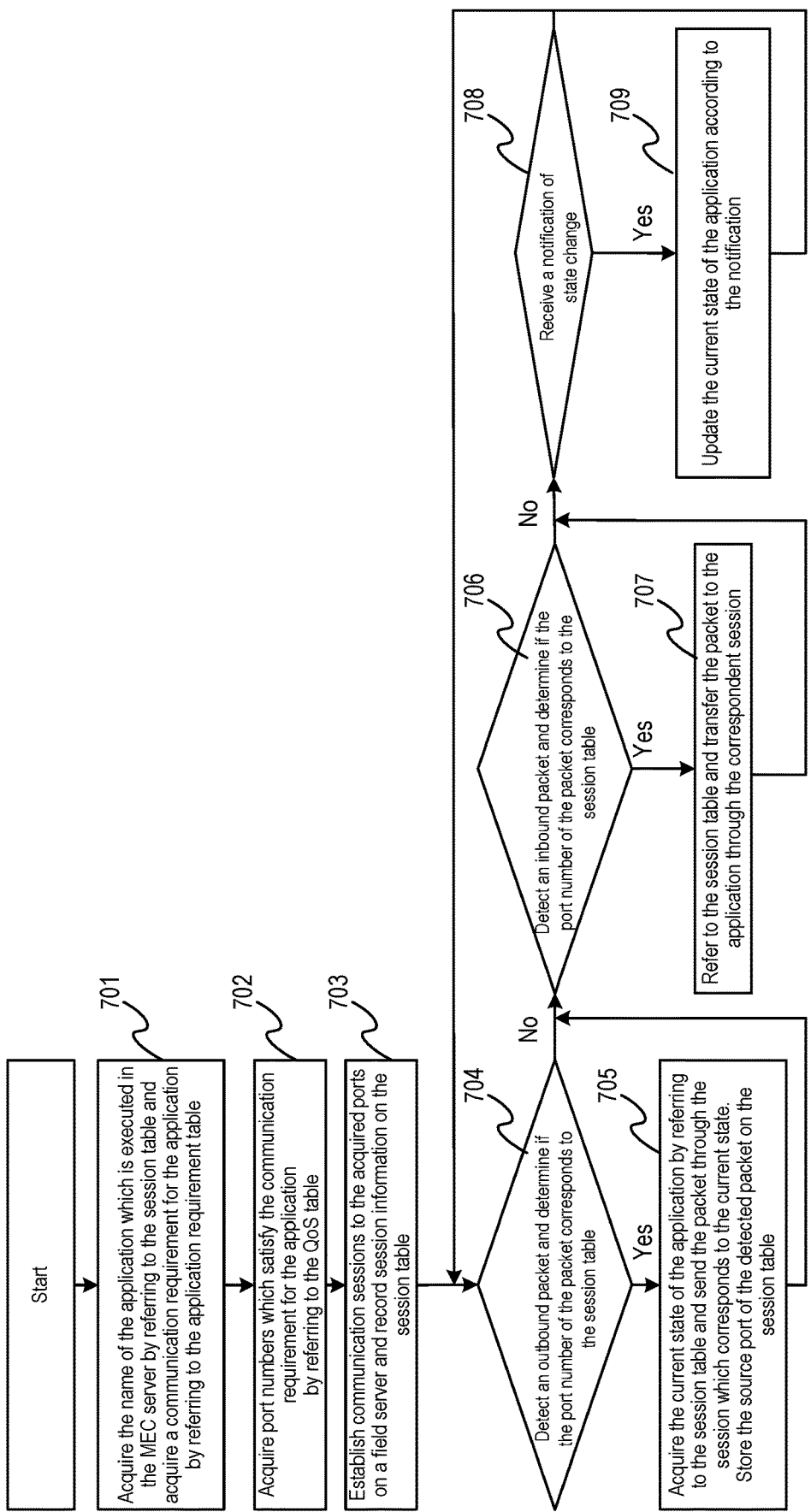
FIG. 7 illustrates a flow chart of a route management server, in accordance with an example implementation.

FIG. 7 illustrates a flow chart of a route management server 603, in accordance with an example implementation. When the route management server 603 starts to operate, it proceeds to step 701. In step 701, the route management server 603 acquires the name of the application which is executed or assigned in the MEC server by referring to the session table, and the corresponding communication requirement for the application by referring to the application requirement table. Then, the flow proceeds to step 702.

In step 702, the route management server acquires port numbers which satisfy the communication requirement for the application by referring to the QoS table. Then, the flow proceeds to step 703.

In step 703, the route management server 603 establishes communication sessions to the acquired ports on a field server, and stores session information on the server session table. Then, the flow proceeds to step 704.

In step 704, if the route management server 603 detects an outbound packet and if the port number of the packet corresponds to the port number stored on the server session table (Yes), then the flow proceeds to 705. If not (No), then the flow proceeds to 706.

In step 705, the route management server 603 acquires the current state of the application by referring to the session table, sends the packet through the session which corresponds to the current state of the application, and stores the source port of the detected packet on the session table. Then, the flow proceeds to 706.

In step 706, if the route management server 603 detects an inbound packet and the port number of the packet corresponds to that stored on the server session table (Yes), then the flow proceeds to step 707. If not (No), the flow proceeds to 708.

In step 707, the route management server 603 refers to the server session table and transfers the packet to the original port of the application. Then, the flow proceeds to step 708.

In step 708, if the route management server 603 receives a notification of a state change of the application (Yes), then the flow proceeds to 709. If not (No), the flow proceeds to 704.

In step 709, the route management server 603 updates the current state of the application to the received one. Then, the flow proceeds to 704.

Figure 8:
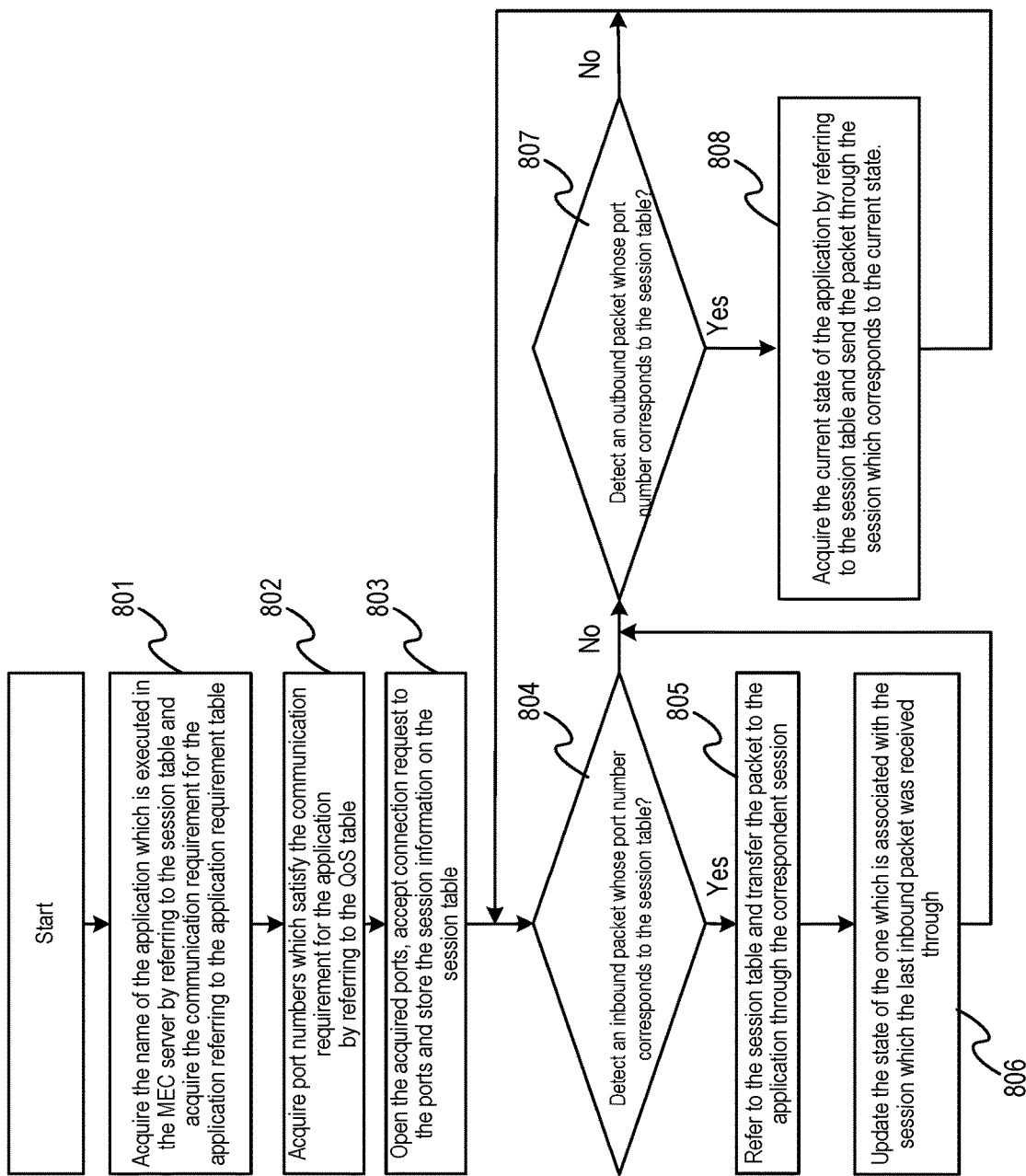
FIG. 8 illustrates a flow chart of a route management client 503, in accordance with an example implementation.

FIG. 8 illustrates a flow chart of a route management client 503, in accordance with an example implementation. When the route management client 503 starts to operate, the flow proceeds to step 801. In step 801, the route management client 503 acquires the name of the application which is executed in the field server by referring to the session table, and communication requirement for the application by referring to the application requirement table. Then, the flow proceeds to step 802.

In step 802, the route management client 503 acquires port numbers which satisfy the communication requirement for the application by referring to the QoS table. Then it proceeds to step 803.

In step 803, the route management client 503 opens the acquired ports, accepts connection requests from route management server 603, and stores session information on the client session table. Then, the flow proceeds to step 804.

In step 804, if the route management client 503 detects an inbound packet whose port number corresponds to that stored on the server session table (Yes), then the flow proceeds to step 805. If not (No), then the flow proceeds to 807.

In step 805, the route management client 503 refers to the client session table and transfers the packet to the application through the correspond session. Then, the flow proceeds to step 806.

In step 806, the route management client 503 updates the state of the application to the one which is associated with the session which the last inbound packet was received through. Then, the flow proceeds to 807.

In step 807, if the route management client 503 detects an outbound packet whose port corresponds to that stored on the server session table (Yes), then the flow proceeds to 808. If not (No), then the flow proceeds to 804.

In step 808, the flow acquires the current state of the application by referring to the session table, and sends the packet through the session which corresponds to the current state of the application. Then, the flow proceeds to 804.

Figure 9:
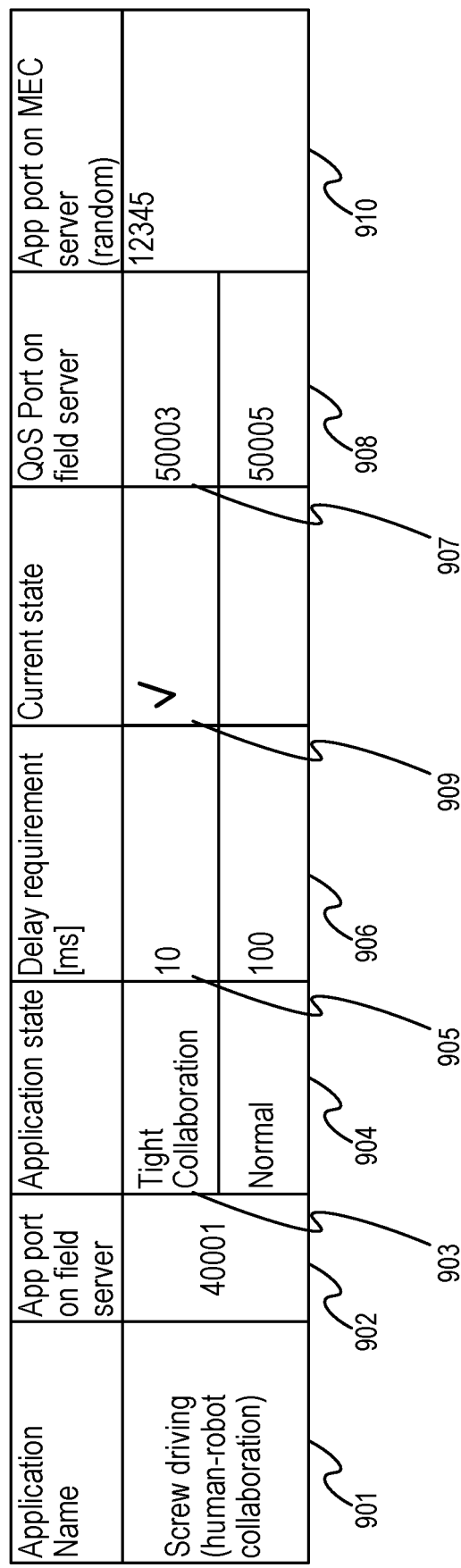
FIG. 9 illustrates an example iteration of the server session table, in accordance with an example implementation.
Figure 10:
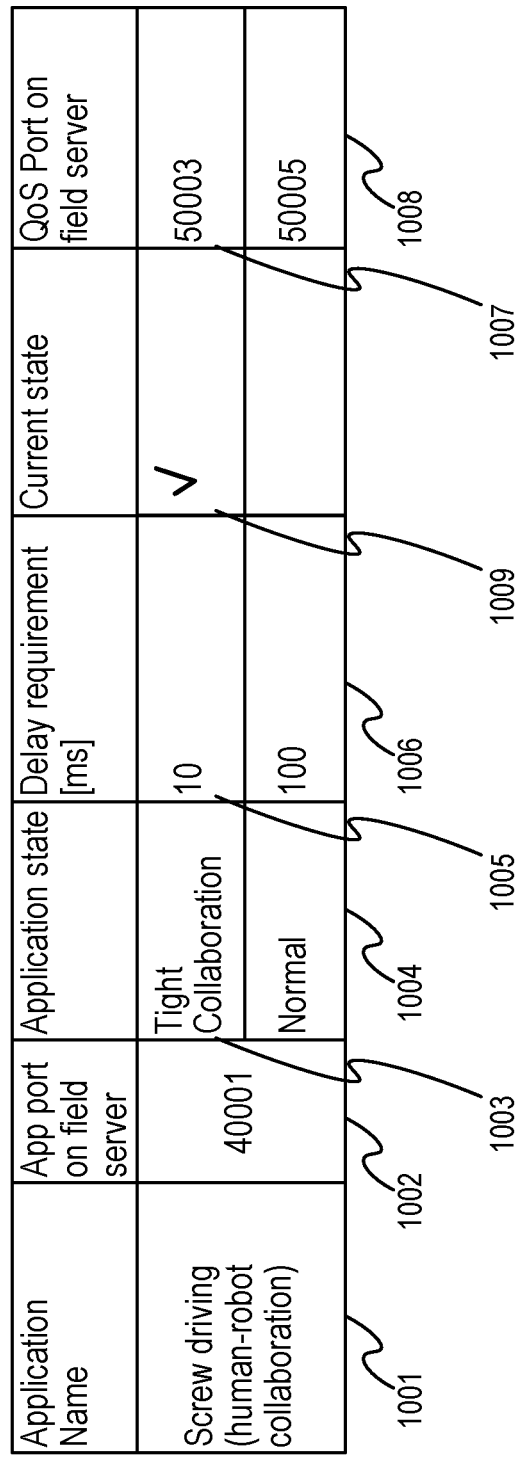
FIG. 10 illustrates an example iteration of the client session table, in accordance with an example implementation.

A more specific example on the operational flow of the route management server 603 and that of the route management client 503 is described as follows. In this example, it is assumed that the screw driving application is stored as an executed application in the server session table in the MEC server and the client session table in the field server. The application requirement table shown in FIG. 3 and the QoS table shown in FIG. 4 are applied. The server session table and the client session table to be created in this example is shown in FIG. 9 and FIG. 10, respectively.

At first, the operational flow of the route management server on a MEC server is described as follows.

In step 701, the route management server acquires screw driving application 901 as the name of the application which is executed in the MEC server by referring to the session table. Then, the route management server acquires communication requirement for screw driving by referring to the application requirement table 201. According to the application requirement table 201, screw driving requires 10 and 100 [ms] delay when the state of screw driving is tight collaboration and normal, respectively.

In step 702, the route management client 603 acquires 50003 and 50005 as the port numbers for delay of 10 and 100 [ms], respectively by referring to the QoS table. In step 703, the route management server 603 establishes communication sessions to the port 50003 and 50005 on the field server and records the session information 902-908 on the session table as shown in FIG. 9.

In step 704, it is assumed that the route management server detects an outbound packet whose destination and source port number is 40001, 12345, respectively. The port number corresponds to the session stored in the session table. Therefore, the flow proceeds to step 705. In step 705, it is assumed that the state of the application is "tight collaboration". The route management server acquires "tight collaboration" 909 as the current state of the application and sends the packet through the session whose destination port is 50003 (907). Then, the route management server stores 12345 (910) as the source port of the detected packet on the session table and proceeds to step 706.

In step 706, it is assumed that the route management server detects an inbound packet whose source port number is 40001. The source port number corresponds to the session (902) stored in the session table. Therefore, the flow proceeds to step 707. In step 707, the route management server refers to the session table and acquires the source port number 12345 (910) and transfers the packet to the application through the session whose source port number is 12345. Then, the route management server proceeds to step 708.

In step 708, it is assumed that the route management server receives a state notification of "normal". The route management server proceeds to step 704 and updates the current state of the application to "normal".

The operational flow on a field server is described as follows. In step 801 the route management client acquires screw driving application 1001 as the name of the application which is executed in the field server by referring to the session table. Then, it acquires the communication requirement for screw driving by referring to the application requirement table. According to the application requirement management table, screw driving requires 10 and 100 [ms] delay when the state of screw driving is tight collaboration and normal, respectively.

In step 802, the route management client acquires 50003 and 50005 as port numbers for delay of 10 and 100 [ms], respectively by referring to the QoS table. In step 803, the route management client opens the ports of 50003 and 50005, accepts connection requests to the ports and store session information (1002-1008) on the session table. Then, the route management client proceeds to step 804.

In step 804, assume that the route management client detects an inbound packet whose destination port number is 50003. It corresponds to the port number 1007 which is stored in the session table. Then the route management client proceeds to step 805. In step 805, the route management client refers to the session table and transfers the packet to the application through the session whose port number is 40001 (1002). Then, the route management client proceeds to step 806.

In step 806, the route management client updates the state to "tight collaboration" 1009 which is associated with the port 50003.

In step 807, assume that the route management server detects an outbound packet whose source port number is 40001. It is associated with the port number 40001 (1002) which is stored on the session table, and the route management client proceeds to step 808.

In step 808, it is assumed that the state of the application is "tight collaboration" 1009. In step 808, the route management client acquires "tight collaboration" 808 as the current state of the application and sends the packet through the session whose port number is 50003 (1007) which corresponds to the state "tight collaboration". Then, the route management client proceeds to 804.

Example implementations can be applied to not only manufacturing processes but also to other applications which involve multiple states. For example, example implementations can be applied to a video streaming application as an example of information technology (IT) applications. The video streaming application can have two states which are "Launch" and "Stable". When video streaming is launched, the state of the application is "launch" where the application requires short delay so that the user can start watching video immediately for better user experience. Once the streaming video is played, the state of the application transitions to "Stable" where the application requires middle or large delay because the user has already been watching streaming video.

Example implementations can provide higher value when it is applied to manufacturing applications because they require their communication requirements to be guaranteed strictly. Unexpected delay in the communication for manufacturing applications can lead to accidents or breakdown of machines, or a cascading effect as many machines may be collaborating together. Through the example implementations described herein, time sensitive manufacturing processes can be ensured of being connected through a communication session with the appropriate QoS level or delay level to facilitate the underlying manufacturing process.

This example implementation enables to dynamically change the allocation of QoS levels to communication with getting the change effective in short time without causing disconnection of communication session which has been already established.

In a second example implementation, there can be systems and methods in which an application requirement table defines the emergency state for each application. Further, an area emergency state table manages which application works in which area, and whether each application is in the state of emergency or not. When an application in an area goes into a state of emergency, any other applications working in the same area are notified of the emergency state in the area, and thereby start to use the communication session for the emergency state.

FIG. 11 illustrates an area emergency state table, in accordance with an example implementation. In an example of the second example implementation, the network management server utilizes an area emergency state table 1100 shown in FIG. 11 and the emergency state distributor in addition to the functions illustrated in the first example implementation. The area emergency state table 1100 can include area ID 1101, client ID 1102, application name 1103, and emergency state 1104. This table stores which application works in which area and field server, and whether the state of the application is in an emergency or not.

The emergency state distributor manages the emergency state in each area. When the emergency state distributor receives a notification of an emergency state from an application state detector, it notifies the emergency state of all the applications which are working in the same area so that they can use the communication session associated with the emergency state. When the emergency state distributor receives a notification of the state transition from the emergency state to any other state, it notifies all the applications in the same area of the transition so that they can use the communication session associated with their current state.

FIG. 12 illustrates an application requirement table, in accordance with an example implementation. The application requirement table 1200 defines "emergency" state 1201, 1202 for each application.

The application state detector in the MEC server stores the ID of the field server which executes the application communicating with the MEC server. When the application state detector detects the application state transition to an emergency state, it sends the notification to the network management server. The notification can include the application name, the field server ID, and the application state transition to the emergency state. When the application state detector detects the application state transition from emergency state to any other state, it sends another notification to the network management server, which includes the application name, the field server ID, and the application state transition from the emergency state to any other state. When the state detector receives a notification of the state transition to emergency in the area, it changes the current state to emergency in the session table. When the state detector receives the notification of the state transition from an emergency state to any other state, it changes the current state to the application's actual state.

A more specific example on the operation of a field server, a MEC and a network management server is described as follows. Assume that FIG. 11 is applied as an area emergency state table 1100 and FIG. 12 is applied as an application requirement table 1200. As shown in FIG. 11, there are no applications in the emergency state. Therefore, the communication session associated with the actual state of an application is used for the communication between the MEC server and the field server. Next, assume that the state transition of the "cutting parts" application to an emergency state works in the field server whose area ID and client ID are 1 and 2, respectively. The application detector in the MEC server which communicates with the field server detects the application state transition to the emergency state and sends it to the network management server. The network management server receives the state transition to the emergency state for the application "cutting parts", which is operating in the field server whose area ID and client ID are 1 and 2, respectively, and reflects the change in the area emergency state table. According to the area emergency state table, there is another field server in area ID 1 whose client ID is 1. Therefore, the emergency state distributor of the network management server sends the notification of the emergency state to the MEC server that is working with the field server whose client ID is 1. The application state detector receives the notification from the network management server and changes the application state to the emergency state. Then, the communication session for emergency state starts to be used.

Next, assume that the state transition of the application "cutting parts" from the emergency state to any other state occurs in the field server whose area ID and client ID are 1 and 2, respectively. The application detector in the MEC server which communicates with the field server detects the application state transition from emergency to any other state and sends it to the network management server. The network management server receives the state transition from emergency to any other state of the application "cutting parts" which is working in the field server whose area ID and client ID are 1 and 2, respectively, and reflects the change in the area emergency state table. According to the area emergency state table, there is the other field server in area ID 1 whose client ID is 1. Therefore, the emergency state distributor of the network management server sends the state transition from emergency to any other state to the MEC server which is working with the field server whose client ID is 1. The application state detector receives the notification from the network management server and changes the application state to its actual state. Then, the communication session for its real state starts to be used.

In manufacturing plants, emergency state of applications can be caused by environmental change such as electronic wave, temperature around field servers. Once those changes happen, they can affect the applications working on the field servers which are close to the source of the changes. In the emergency state of an application, the application can need to be shut down immediately, so it needs higher requirements for its communication. In this execution, once an application in an area transitions to the state of emergency, the applications in the same area can use the communication for emergency state before they actually go into emergency state. Therefore, the safe operation of manufacturing process is facilitated.

Example implementations can provide a method to allocate optimal QoS level to each device in manufacturing field.

Figure 13:
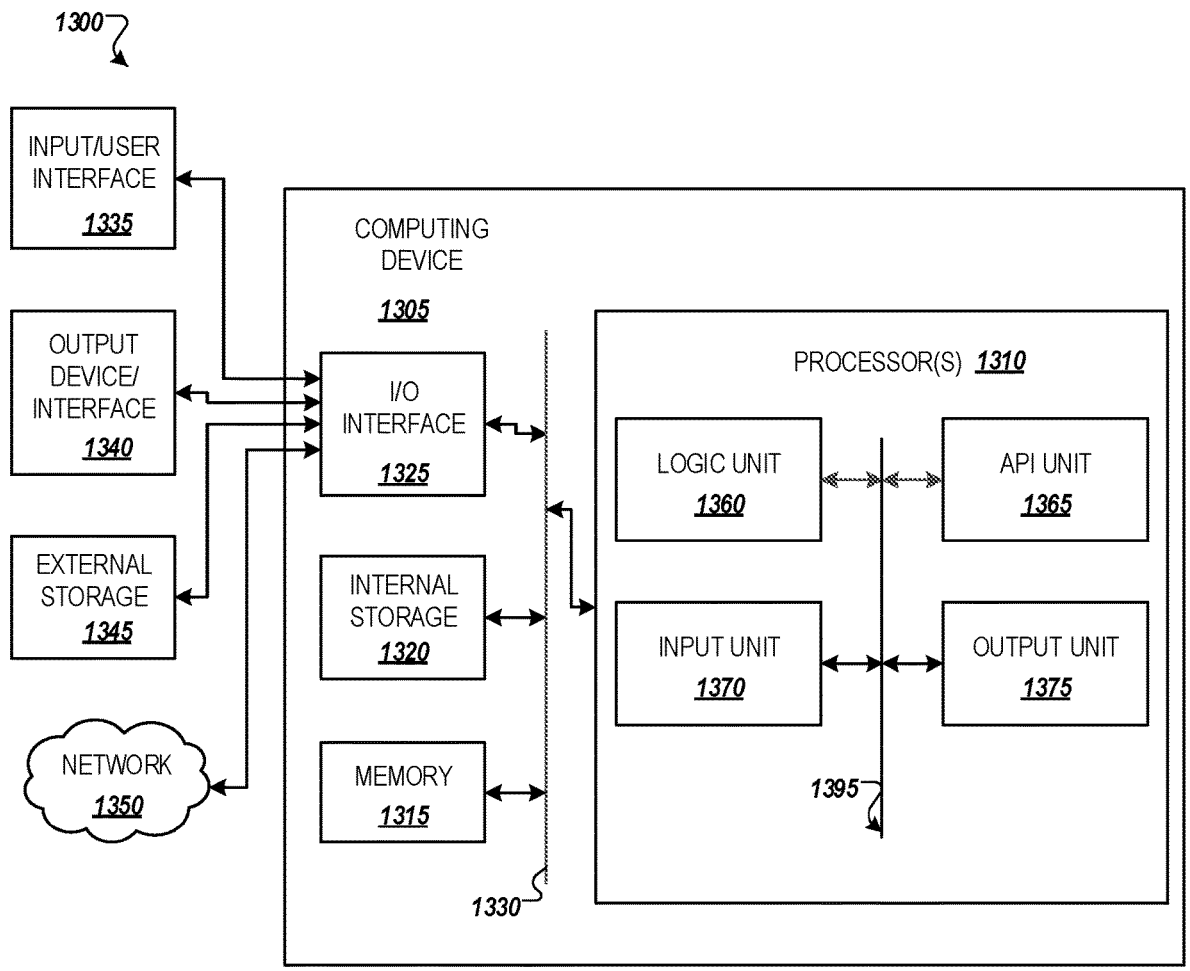
FIG. 13 illustrates an example computing environment with an example computer device suitable for use in some example implementations.

FIG. 13 illustrates an example computing environment with an example computer device suitable for use in some example implementations, such as the network management server 101, field server 102, or MEC server 104 as illustrated in FIG. 1.

Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

In an example implementation as illustrated in FIG. 1, the computer device 1305 can be used for management of a system involving a plurality of apparatuses (e.g., manufacturing devices associated with the sensors and actuators), each of the plurality of apparatuses managing a corresponding target application based on instructions from a server, the plurality of apparatuses communicating with the server (e.g., network management server) through a network, the computer device involving processor(s) 1310, configured to, for each of the plurality of apparatuses, obtain a plurality of states of the corresponding target application, each of the plurality of states corresponding to a delay requirement; establish a plurality of communication sessions, each of the plurality of communication sessions facilitated by a network (NW) slice (e.g. each slice having a different SLA) and an associated port, each of the plurality of communication sessions configured to satisfy a corresponding one of the plurality of states; specify one of the plurality of communication sessions that satisfies a current state of the corresponding target application; send data through the specified one of the plurality of communication sessions for the each of the plurality of apparatuses; and for a change of the corresponding target application from the current state to another state, change the one of the plurality of communication sessions to another one of the plurality of communication sessions configured to satisfy the another state as illustrated in FIG. 4 and in FIG. 7 at 708-709. In example implementations, the corresponding target application can be a manufacturing process executed by the each of the plurality of apparatuses as described herein.

Processor(s) 1310 can be configured to send the data through the specified one of the plurality of communication sessions by, for the data being an outbound packet to the each of the plurality of apparatuses and directed to a destination port, determining the current state of the corresponding target application corresponding to the each of the plurality of apparatuses; transmitting the outbound packet to the destination port through the specified one of the plurality of communication sessions; and storing a source port number of the outbound packet in session information for handling inbound packets as illustrated in FIG. 7, 704-705.

Processor(s) 1310 can be configured to, for receipt of an inbound packet directed to a port, identify a source port corresponding to the inbound packet based on session information; and transfer the inbound packet to the identified source port as illustrated at FIG. 7, 706-707.

In an example of a MEC server, processor(s) 1310 can be configured to obtain a change of the corresponding target application obtain a change of the corresponding target application from the current state to another state for ones of the plurality of plurality of apparatuses operating in a same area from a plurality of areas as provided by a network management server managing areas illustrated in FIG. 11. In the examples of FIGS. 11 and 12 in which an emergency state change of one application of an apparatus in one area causes all applications of all apparatuses in the same area to switch to emergency state, processor(s) 1310 can be configured to, for the change of the corresponding target application from the current state to another state being an emergency state from one of the plurality of apparatuses, change the one of the plurality of communication sessions to another one of the plurality of communication sessions configured to satisfy the emergency state for the corresponding target application of all the ones of the plurality of apparatuses operating in a same area of the plurality of areas as the one of the plurality of apparatuses.

In an example as illustrated in FIG. 8, processor(s) 1310 can be configured to, for receipt of an inbound packet by a client device directed to the corresponding target application of one of the plurality of apparatuses, transmit the inbound packet to a destination port of the one of the plurality of apparatuses associated with the inbound packet; and update the current state of the corresponding target application based on a source session of the plurality of communication sessions from which the inbound packet was received.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for management of a system involving a plurality of apparatuses, each of the plurality of apparatuses managing a corresponding target application based on instructions from a server, the plurality of apparatuses communicating with the server through a network, the method comprising:
   for each of the plurality of apparatuses:
   obtaining a plurality of states of the corresponding target application, each of the plurality of states corresponding to a delay requirement;
   establishing a plurality of communication sessions, each of the plurality of communication sessions facilitated by a network (NW) slice and an associated port, each of the plurality of communication sessions configured to satisfy a corresponding one of the plurality of states;
   specifying one of the plurality of communication sessions that satisfies a current state of the corresponding target application;
   sending data through the specified one of the plurality of communication sessions for the each of the plurality of apparatuses; and
   for a change of the corresponding target application from the current state to another state, changing the one of the plurality of communication sessions to another one of the plurality of communication sessions configured to satisfy the another state.

2. The method of claim 1, wherein the corresponding target application is a manufacturing process executed by the each of the plurality of apparatuses.

3. The method of claim 1, wherein the sending the data through the specified one of the plurality of communication sessions comprises:

for the data being an outbound packet to the each of the plurality of apparatuses and directed to a destination port:
  determining the current state of the corresponding target application corresponding to the each of the plurality of apparatuses;
  transmitting the outbound packet to the destination port through the specified one of the plurality of communication sessions; and
  storing a source port number of the outbound packet in session information for handling inbound packets.

4. The method of claim 1, further comprising:
for receipt of an inbound packet directed to a port, identifying a source port corresponding to the inbound packet based on session information; and
transferring the inbound packet to the identified source port.

5. The method of claim 1, further comprising:
managing a plurality of areas, each of the plurality of areas associated with one or more indications of an emergency state corresponding to the corresponding target application of ones of the plurality of apparatuses operating in the each of the plurality of areas;
wherein one of the plurality of states of the corresponding target application is the emergency state;
wherein, for the change of the corresponding target application from the current state to the emergency state from one of the plurality of apparatuses, changing the one of the plurality of communication sessions to another one of the plurality of communication sessions configured to satisfy the emergency state for the corresponding target application of all the ones of the plurality of apparatuses operating in a same area of the plurality of areas as the one of the plurality of apparatuses.

6. The method of claim 1, further comprising:
for receipt of an inbound packet by a client device directed to the corresponding target application of one of the plurality of apparatuses:
  transmitting the inbound packet to a destination port of the one of the plurality of apparatuses associated with the inbound packet; and
  updating the current state of the corresponding target application based on a source session of the plurality of communication sessions from which the inbound packet was received.

7. A non-transitory computer readable medium, storing instructions for executing a process for management of a system involving a plurality of apparatuses, each of the plurality of apparatuses managing a corresponding target application based on instructions from a server, the plurality of apparatuses communicating with the server through a network, the instructions comprising:
for each of the plurality of apparatuses:
  obtaining a plurality of states of the corresponding target application, each of the plurality of states corresponding to a delay requirement;
  establishing a plurality of communication sessions, each of the plurality of communication sessions facilitated by a network (NW) slice and an associated port, each of the plurality of communication sessions configured to satisfy a corresponding one of the plurality of states;
  specifying one of the plurality of communication sessions that satisfies a current state of the corresponding target application;
  sending data through the specified one of the plurality of communication sessions for the each of the plurality of apparatuses; and
  for a change of the corresponding target application from the current state to another state, changing the one of the plurality of communication sessions to another one of the plurality of communication sessions configured to satisfy the another state.

8. The non-transitory computer readable medium of claim 7, wherein the corresponding target application is a manufacturing process executed by the each of the plurality of apparatuses.

9. The non-transitory computer readable medium of claim 7, wherein the sending the data through the specified one of the plurality of communication sessions comprises:
for the data being an outbound packet to the each of the plurality of apparatuses and directed to a destination port:
  determining the current state of the corresponding target application corresponding to the each of the plurality of apparatuses;
  transmitting the outbound packet to the destination port through the specified one of the plurality of communication sessions; and
  storing a source port number of the outbound packet in session information for handling inbound packets.

10. The non-transitory computer readable medium of claim 7, the instructions further comprising:
for receipt of an inbound packet directed to a port, identifying a source port corresponding to the inbound packet based on session information; and
transferring the inbound packet to the identified source port.

11. The non-transitory computer readable medium of claim 7, the instructions further comprising:
managing a plurality of areas, each of the plurality of areas associated with one or more indications of an emergency state corresponding to the corresponding target application of ones of the plurality of apparatuses operating in the each of the plurality of areas;
wherein one of the plurality of states of the corresponding target application is the emergency state;
wherein, for the change of the corresponding target application from the current state to the emergency state from one of the plurality of apparatuses, changing the one of the plurality of communication sessions to another one of the plurality of communication sessions configured to satisfy the emergency state for the corresponding target application of all the ones of the plurality of apparatuses operating in a same area of the plurality of areas as the one of the plurality of apparatuses.

12. The non-transitory computer readable medium of claim 7, the instructions further comprising:
for receipt of an inbound packet by a client device directed to the corresponding target application of one of the plurality of apparatuses:
  transmitting the inbound packet to a destination port of the one of the plurality of apparatuses associated with the inbound packet; and
  updating the current state of the corresponding target application based on a source session of the plurality of communication sessions from which the inbound packet was received.

13. A computer device for management of a system involving a plurality of apparatuses, each of the plurality of apparatuses managing a corresponding target application based on instructions from a server, the plurality of apparatuses communicating with the server through a network, the computer device comprising:
a processor, configured to, for each of the plurality of apparatuses:
obtain a plurality of states of the corresponding target application, each of the plurality of states corresponding to a delay requirement;
establish a plurality of communication sessions, each of the plurality of communication sessions facilitated by a network (NW) slice and an associated port, each of the plurality of communication sessions configured to satisfy a corresponding one of the plurality of states;
specify one of the plurality of communication sessions that satisfies a current state of the corresponding target application;
send data through the specified one of the plurality of communication sessions for the each of the plurality of apparatuses; and
for a change of the corresponding target application from the current state to another state, change the one of the plurality of communication sessions to another one of the plurality of communication sessions configured to satisfy the another state.

14. The computer device of claim 13, wherein the corresponding target application is a manufacturing process executed by the each of the plurality of apparatuses.

15. The computer device of claim 13, wherein the processor is configured to send the data through the specified one of the plurality of communication sessions by:
for the data being an outbound packet to the each of the plurality of apparatuses and directed to a destination port:
determining the current state of the corresponding target application corresponding to the each of the plurality of apparatuses;
transmitting the outbound packet to the destination port through the specified one of the plurality of communication sessions; and
storing a source port number of the outbound packet in session information for handling inbound packets.

16. The computer device of claim 13, the processor configured to:
for receipt of an inbound packet directed to a port, identify a source port corresponding to the inbound packet based on session information; and
transfer the inbound packet to the identified source port.

17. The computer device of claim 13, the processor configured to:
obtain a change of the corresponding target application from the current state to another state for ones of the plurality of plurality of apparatuses operating in a same area from a plurality of areas;
wherein, for the change of the corresponding target application from the current state to the another state being an emergency state from one of the plurality of apparatuses, the processor is configured to change the one of the plurality of communication sessions to another one of the plurality of communication sessions configured to satisfy the emergency state for the corresponding target application of all the ones of the plurality of apparatuses operating in the same area of the plurality of areas as the one of the plurality of apparatuses.

18. The computer device of claim 13, the processor configured to:
for receipt of an inbound packet by a client device directed to the corresponding target application of one of the plurality of apparatuses:
transmit the inbound packet to a destination port of the one of the plurality of apparatuses associated with the inbound packet; and
update the current state of the corresponding target application based on a source session of the plurality of communication sessions from which the inbound packet was received.

* * * * *